W. O. SHADBOLT.
FIFTH WHEEL FOR VEHICLES.
APPLICATION FILED SEPT. 18, 1913.

1,099,152.

Patented June 2, 1914.
4 SHEETS—SHEET 1.

WITNESSES:
Anna Duffy.
Aug. P. Jurgensen

INVENTOR:
William Oscar Shadbolt
BY
Edmond Conger Brown
ATTORNEY

W. O. SHADBOLT.
FIFTH WHEEL FOR VEHICLES.
APPLICATION FILED SEPT. 18, 1913.

1,099,152.

Patented June 2, 1914.
4 SHEETS—SHEET 2.

WITNESSES:
Anna Duffy.
Aug. P. Jurgensen

INVENTOR:
William Oscar Shadbolt
BY
Edmond Congar Brown
ATTORNEY

W. O. SHADBOLT.
FIFTH WHEEL FOR VEHICLES.
APPLICATION FILED SEPT. 18, 1913.

1,099,152.

Patented June 2, 1914.
4 SHEETS—SHEET 3.

WITNESSES:
Anna Duffy
Aug. P. Jungensen

INVENTOR:
William Oscar Shadbolt
BY Edmond Congar Brown
ATTORNEY

W. O. SHADBOLT.
FIFTH WHEEL FOR VEHICLES.
APPLICATION FILED SEPT. 18, 1913.

1,099,152.

Patented June 2, 1914.

4 SHEETS—SHEET 4.

WITNESSES:
Anna Duffy
Aug. P. Jurgensen

INVENTOR:
William Oscar Shadbolt
BY
Edmond Conger Brown
ATTORNEY

UNITED STATES PATENT OFFICE.

WILLIAM OSCAR SHADBOLT, OF NEW YORK, N. Y.

FIFTH-WHEEL FOR VEHICLES.

1,099,152. Specification of Letters Patent. Patented June 2, 1914.

Application filed September 18, 1913. Serial No. 790,497.

*To all whom it may concern:*

Be it known that I, WILLIAM OSCAR SHADBOLT, a citizen of the United States, and a resident of the city and State of New York, have invented certain new and useful Improvements in Fifth-Wheels for Vehicles, of which the following is a specification.

My invention relates to that class of devices known as fifth wheels, which are commonly employed for pivotally connecting the front axles of vehicles to the reach or to the body of the vehicle, and which may also be employed for the purpose of providing a pivotal connection between a tractor and a truck body or the like.

The object of my invention is to provide a fifth wheel which shall obviate certain of the disadvantages of such devices previously known and which shall possess certain advantages over prior devices, as hereinafter explained.

The invention consists in the novel construction, arrangement and combination of devices and elements as shown in the accompanying drawings and fully described in this specification.

Figure 1:
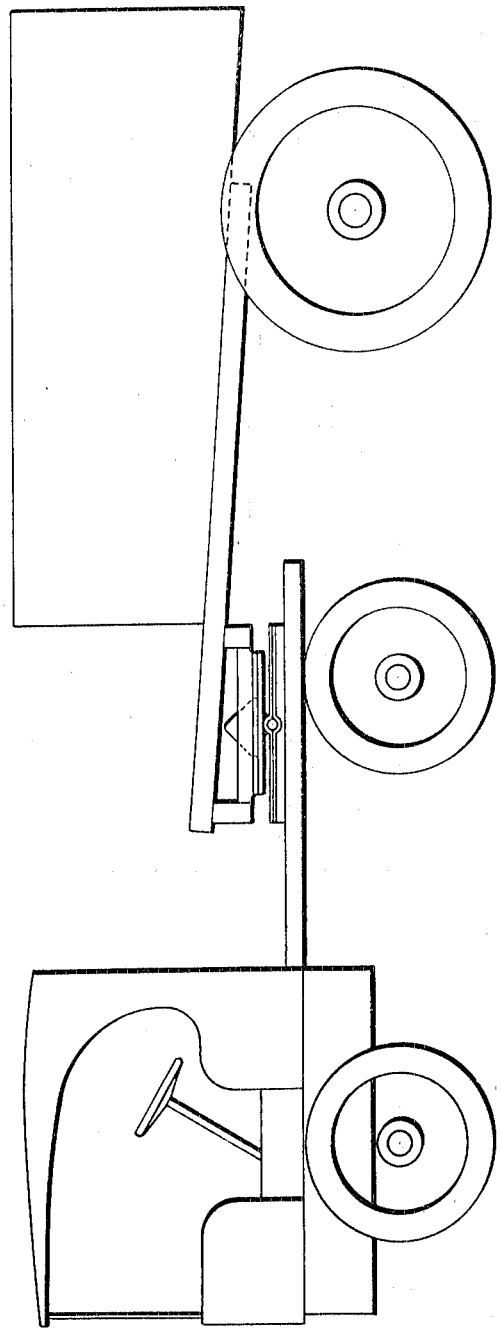
Figure 2:
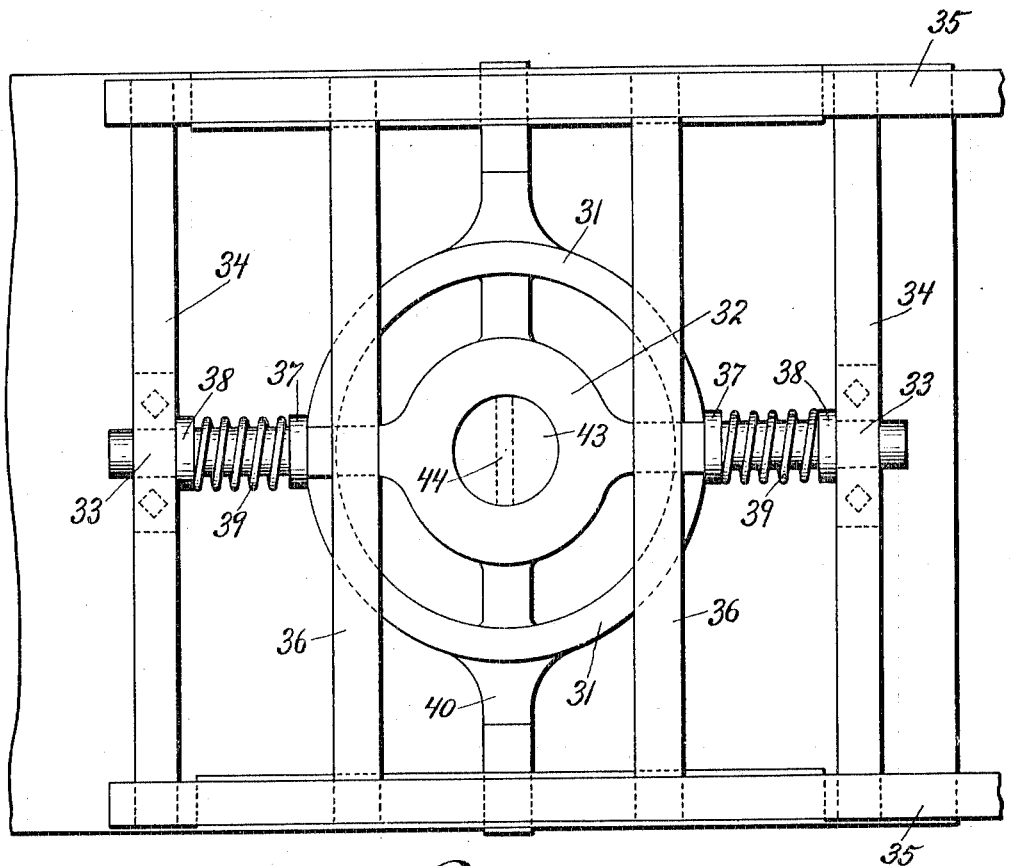
Figure 3:
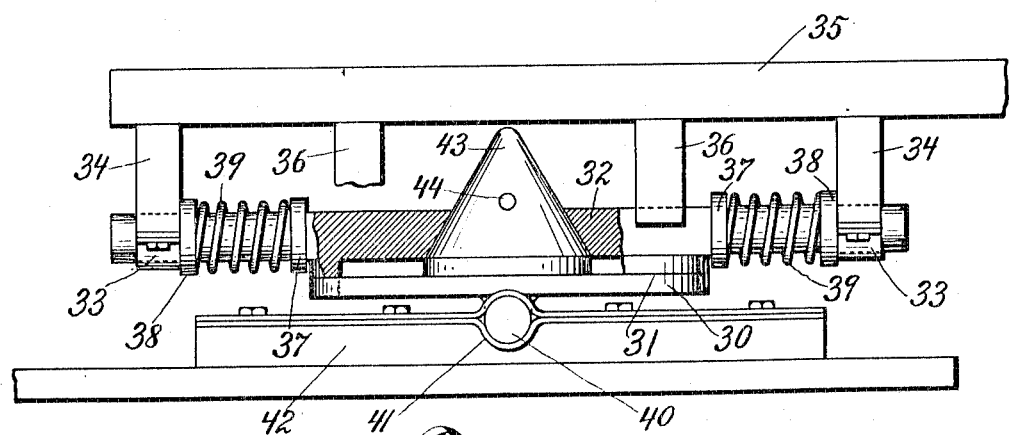
Figure 4:
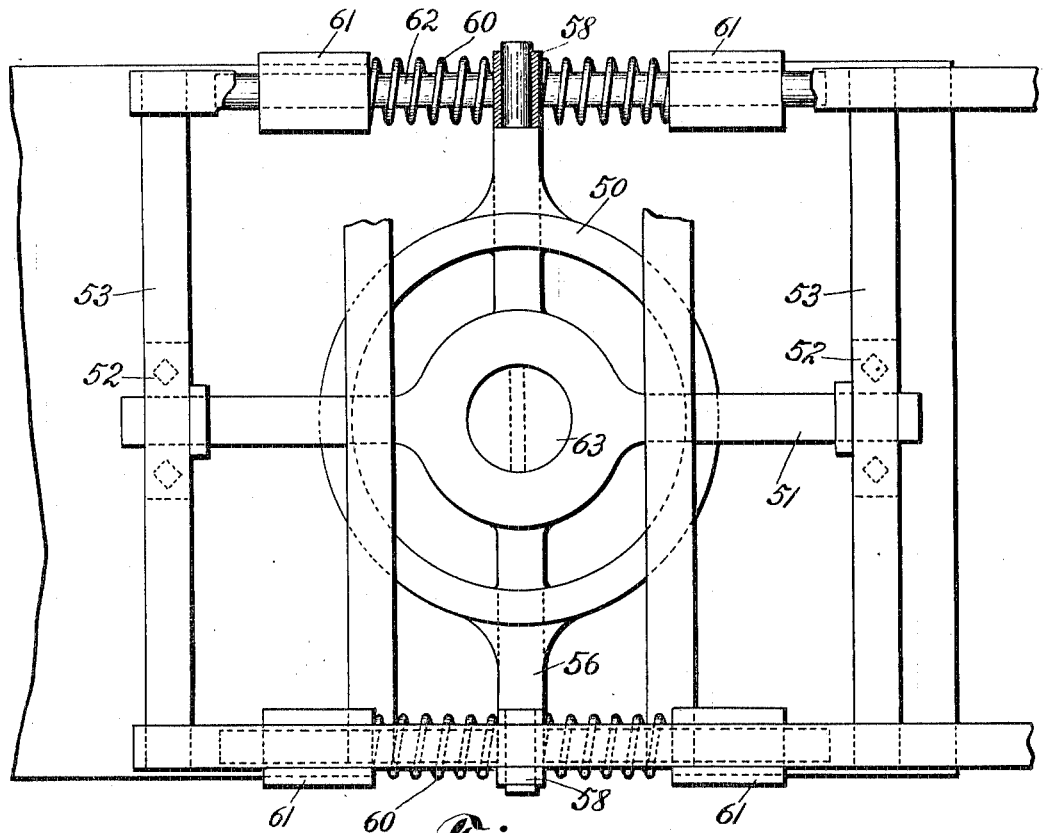
Figure 5:
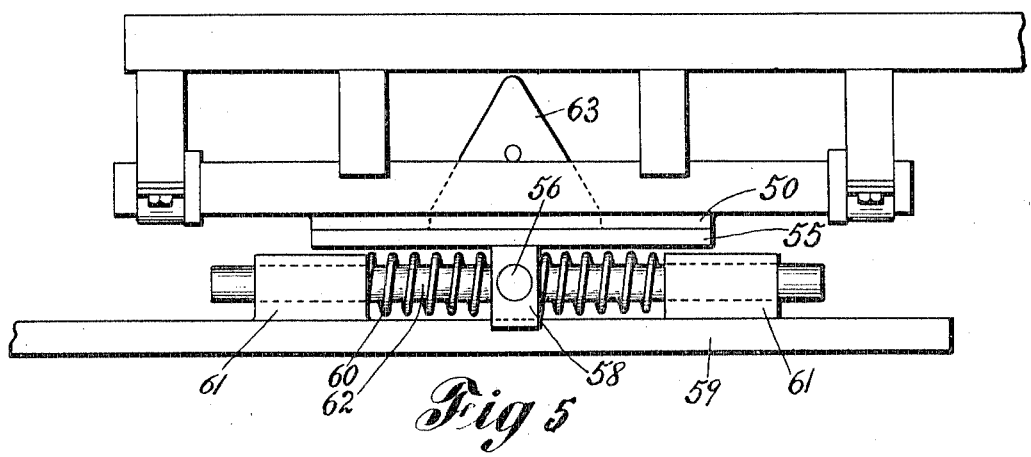
Figure 6:
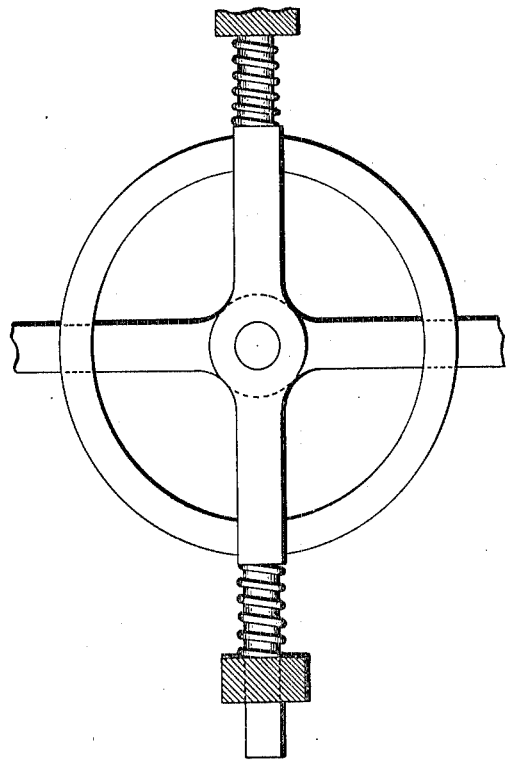
Figure 7:
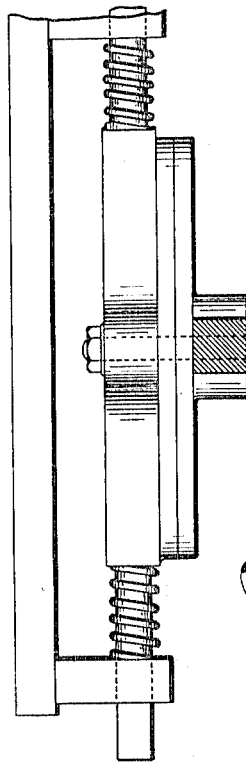

In the accompanying drawings, Figure 1 is a side view of a tractor and a truck, showing diagrammatically the same coupled together by means of a fifth wheel embodying my invention according to one of the forms thereof; Fig. 2 is a plan view of a form of the invention comprising shock-absorbing springs and also a pivot member of conical shape, and Fig. 3 is a side elevation of the same; Fig. 4 is a plan view of another form of the invention showing the springs operatively connected with the lower member of the fifth wheel, and Fig. 5 is a side elevation of same; Fig. 6 is a plan view of another form of the invention comprising shock-absorbing springs and with a king-bolt, and Fig. 7 is a side elevation of same.

In carrying my invention into effect, in the embodiments thereof which I have selected for the purpose of illustration and description in this application for patent thereon, and referring now particularly to the form of the invention shown in Figs. 2 and 3 I provide a fifth wheel comprising two annular members 30 and 31. The upper member 31 is provided with a diametrically extending member 32, the middle part of which is split so as to assume an annular form and the ends of which project beyond the periphery of the annular member 31 and are journaled in sockets 33 in cross-bars 34 which extend across between longitudinal beams 35 secured to the under side of a truck body or the like. The projecting portions of the member 32 are free to move longitudinally to a certain extent in said sockets and in between the sills 34 I prefer to interpose additional cross-bars 36 as shown in Fig. 2. Fast on said projecting portions, adjacent to the periphery of the annular member 31, are annular shoulders 37, and loose on said projecting members, inside of the cross-bars 34 are washers 38. Between the shoulders 37 and the washers 38 I interpose helical springs 39.

The lower annular member 30 is provided with a diametrically extending member 40, the projecting ends of which are journaled in sockets 41 in beams 42 on the frame of the tractor.

From the portion of the diametrically extending member 40 which is inside of the annular member 30 extends upward a conical member 43, which is in part analogous to the king-bolt in the ordinary form of fifth wheel. This conical member is adapted, when the two annular members are assembled, to project up through the opening in the annular portion of the diametrically extending member 32, and the said conical member 43 is provided with a transverse opening 44 above the plane of the upper surface of the annular portion of the member 32, which opening is adapted to receive a pin or bolt which serves to prevent the separation of the two annular members under strain.

In the form of my invention shown in Figs. 4 and 5 I provide an upper annular member 50, provided with a diametrically extending member 51, the projecting ends of which are journaled in sockets 52 in cross-bars 53 which are secured to the under side of a truck or the like in a manner similar to that already described. I also provide a lower annular member 55, provided with a diametrically extending member 56, the projecting ends of which are journaled in sockets in blocks 58 which are adapted to slide longitudinally on beams 59 fast on the frame of a tractor or the like. Any excessive or undue longitudinal movement of said blocks 58 is prevented by the helical springs 60, which bear against blocks 61 fast on the beams 59 and against the blocks 58, the said springs being kept in straight alinement by the rods 62 which pass through openings in the blocks 61. The conical coupling member 63 and the method of its operation in holding the annular members assembled is similar to what has already been described with regard to the last above mentioned form of my invention.

In Figs. 6 and 7 of the accompanying drawings I show a form of my invention provided with shock-absorbing springs, in connection with the upper annular member but with an ordinary king-bolt acting as a coupling member. The construction of this form of my invention will be well understood from what has been already explained with regard to other forms, and need not be here again particularly set forth.

In Fig. 1 I have shown diagrammatically a tractor and truck coupled together by means of a fifth wheel embodying my invention. It will be observed that the point of pivotal connection between the tractor and the truck is a substantial distance forward of the rear axle of the tractor. By this arrangement I greatly facilitate the handling of the truck, particularly in backing the same into a predetermined position by means of the tractor.

The advantages of the invention will be obvious from what has been above said, but I may mention briefly that some of the more important advantages attained are: the freedom of movement of the planes of the tractor and the truck with respect to each other, it being possible for said planes to assume various angular relations with respect to each other while still remaining pivotally coupled together; the freedom from undue shock or strain to the coupling due to the shock-absorbing springs; and finally the important advantage of ease of coupling together a tractor and truck. When an ordinary form of fifth wheel, comprising a king-bolt of the usual type is employed as a means of coupling a tractor and truck together, it is obvious that the tractor and the truck must be brought so accurately into correct relation that the opening in the upper member of the fifth wheel, on the truck, shall be exactly in register with the opening in the lower member, on the tractor, before the king-bolt can drop into its opening in the lower member. In using a fifth wheel coupling provided with a conical member, as described in this specification, it is not necessary to bring the parts into such exact relations, for it is obvious that if any part of the comparatively large opening in the upper member is brought into position over the projecting member and the truck body allowed to descend, the parts will automatically place themselves in the proper position. If then a pin or bolt is placed in the transverse opening in the projecting member the two annular members of the fifth wheel are held securely together.

Having thus described my invention, what I claim as new and desire to secure by Letters Patent is as follows:

1. A fifth wheel, comprising an upper member provided with lateral projections and slidably secured to the under side of the frame of a vehicle, a stop secured to the under side of said vehicle, a spring between said upper member and said stop, a lower member having lateral projections journaled over devices below the vehicle, and means adapted to pivotally connect the said members together.

2. A fifth wheel, comprising a member provided with lateral projections and secured to the under side of the frame of a vehicle, a member secured to devices below the vehicle, one of said members being adapted to slide backward or forward with relation to the devices to which it is secured, a stop secured in a position lying beneath the frame of said vehicle, a spring between said sliding member and said stop, and means adapted to pivotally connect the said members together.

3. A fifth wheel, comprising an upper member slidably secured to the under side of the frame of a vehicle, a stop secured to the under side of said vehicle, a spring between said upper member and said stop, a lower member secured to devices below the vehicle, and means adapted to pivotally connect the said members together, said pivotally connecting means comprising a device projecting from one of said members, of a form decreasing in diameter from its base outward, and an opening in the other of said members adapted to engage with said projecting device.

4. A fifth wheel, comprising an upper member secured to the under side of the frame of a vehicle, a lower member secured to devices below the vehicle, one of said members being adapted to slide forward or backward, a stop secured in a position lying beneath the frame of said vehicle, a spring between said sliding member and said stop, and means adapted to pivotally connect the said members together, said pivotally connecting means comprising a device projecting from one of said members, of a form decreasing in diameter from the base outward, and an opening in the other of said members adapted to engage with said projecting device.

In witness whereof I have hereunto signed my name this 17th day of September 1913, in the presence of two subscribing witnesses.

WILLIAM OSCAR SHADBOLT.

Witnesses:
EDWARD CONGAR BROWN,
WILLIAM N. MACLEAN.